United States Patent Office 3,141,031
Patented July 14, 1964

3,141,031
OLEFIN COBALT CARBONYL COMPOUNDS
Geoffrey Wilkinson, London, England, assignor to Ethyl Corporation, New York, N.Y., a corporation of Virginia
No Drawing. Filed Aug. 1, 1961, Ser. No. 128,371
Claims priority, application Great Britain Aug. 23, 1960
19 Claims. (Cl. 260—439)

This invention relates to and has as a principal object the provision of new diolefin-transition metal-carbonyl complexes of the cobalt sub-group of metals and a method for their manufacture. A preferred form of the invention are the diolefin-cobalt-carbonyl complexes.

The compounds of the invention are generally formed by reaction between a diolefin, either cyclic or acylic, and a transition metal carbonyl compound of the cobalt sub-group, i.e., cobalt, rhodium, and iridium. As illustrated for cobalt, these compounds are of two types which are:

(1) $Co_2(CO)_6$ (diolefin)

and (2) $Co_2(CO)_4$ (diolefin)2

In these compounds, the carbonyl groups bridging the two cobalt atoms are retained.

Typical of the various diolefins which may be present as a bonding moiety in the compounds of the invention are norbornadiene which is bicyclo(2:2:1)hepta-2:5-diene; cyclohexa-1,3-diene; 2,3-dimethylbuta-1,3-diene; isoprene and buta-1,3-diene. In general, the diolefins I prefer to use are those containing between 4 and 7 carbon atoms. The diolefin may be either cyclic or non-cyclic. In the new complexes of this invention, the diolefin coordinates as a molecular entity rather than a radical derived from the diolefin; for example, butadiene complexes with dicobalt octacarbonyl in accordance with my invention to produce a product in which the organic fragment is $C_4H_6$ rather than the radical $C_4H_5$.

The compounds of the invention are useful as fuel additives and may be added to hydrocarbon distillate fuels, e.g., jet fuel, diesel fuel, and home heater fuels, and also to gasoline used in internal combustion engines. Further, many of the compounds are useful as additives in hydrocarbon lubricants such as oils and greases. A further utility of the compounds is as a metal source in gas-phase metal plating. In this use the compounds, on decomposition, deposit metal on the object to be plated. The compounds may also be employed as catalysts in organic reactions involving diolefins, olefins, and other organic reactants. One utility for instance is as a catalyst in the well-known Oxo-process.

The compounds of the invention are generally stable in air at room temperature. Those compounds containing two diolefin groups are more stable thermally than the mono-substituted products. The mono-substituted compounds are generally readily soluble in common organic solvents, while the products containing two diolefin groups are much less soluble. The latter compounds are generally fairly soluble in chloroform, less soluble in benzene and carbon disulfide and sparingly soluble in ether and petroleum ether. Solutions of the compounds are, in general, fairly air sensitive.

My new products are prepared by reaction of the diolefin with the carbonyl of the cobalt sub-group metal. Reaction proceeds readily at moderate temperatures such as 40–60° C. and is usually complete in about 2 to 4 hours. I ordinarily use an inert solvent such as petroleum ether of boiling point 40–60° C., petroleum ether boiling at 60–80° C. and, in general, saturated hydrocarbons, whose normal boiling point is at least as high as the reaction temperature I use. Temperatures and reaction times much in excess of those enumerated above are ordinarily to be avoided. Higher temperatures and longer reaction times tend to lead to decomposition of the products, resulting in the formation of cobalt metal and tetracobalt dodecacarbonyl.

The products of the invention can be separated from the reaction mixture by conventional means such as crystallization and chromatography on adsorbents such as alumina.

In addition to the simple metal carbonyls as reactants, I can also employ substituted carbonyls. For example, in refluxing diphenyl acetylene dicobalt hexacarbonyl with the norbornadiene in light petroleum ether for two hours, I obtained a red solid product which on crystallization from ether was found to be identical with the dinorbornadiene dicobalt tetracarbonyl obtained by the procedure of Example I below.

The products of the invention, in general, are solid materials varying from golden yellow to orange-red. They cannot be sublimed in vacuum without extensive decomposition, a property which is important in their use as vapor plating agents.

To further illustrate the compounds of the invention and their mode of preparation, there are presented the following examples in which all parts and percentages are by weight unless otherwise indicated.

*Example I*

A mixture comprising 0.86 gram of dicobalt octacarbonyl and 4.6 grams of norbornadiene in 30 ml. of light petroleum ether having a boiling point of 40–60° C. was heated at reflux for two hours under a nitrogen atmosphere. Gas was evolved, and an orange-red product precipitated. After removal of solvent and excess olefin by heating in vacuo, the product dinorbornadienedicobalt tetracarbonyl was crystallized repeatedly from ether. The yield was 0.72 gram or 70 percent based on the dicobalt octacarbonyl. The product occurred as red needles which decomposed at 147° C. On analysis, there was found: C, 52.0; H, 3.8; O, 15.7; Co, 28.6 percent with a molecular weight of 424. $C_{16}H_{16}O_4Co_2$ requires: C, 52.2; H, 3.9; O, 15.5; Co, 28.5 percent with a molecular weight of 414.

Small quantities of the mono-substituted derivatives were also found in the reaction mixture from Example I. This compound was obtained in higher yield in another run by using equimolar quantities of the reactants under conditions similar to those employed above. After removal of the solvent and excess dicobalt octacarbonyl, the product was chromatographed on an alumina column using a benzene-petroleum ether mixture as the eluant. The first fraction gave norbornadienedicobalt hexacarbonyl which was recrystallized from petroleum ether at −40° C. as red needles which decomposed at 97° C. On analysis, there was found: C, 41.2; H, 2.6; O, 25.1 percent with a molecular weight of 379. $C_{13}H_8O_6Co_2$ requires: C, 41.3; H, 2.1; O, 25.4 percent with a molecular weight of 378.

*Example II*

A mixture comprising 0.86 gram of dicobalt octacarbonyl and 1.6 grams of cyclohexa-1,3-diene in 40 ml. of petroleum ether (B.P. 60–80° C.) was heated at reflux for four hours under nitrogen. After removal of solvent and excess olefin by heating in vacuo, the dark residue was extracted with chloroform and chromatographed on alumina using a petroleum ether-chloroform mixture as the eluant. Crystallization of the eluted product from ether gave golden plates of dicyclohexa-1,3-dienedicobalt tetracarbonyl which decomposed on heating to 100° C. On analysis, there was found: C, 49.2; H, 4.8; O, 16.4 percent. $C_{16}H_{16}O_4Co_2$ requires: C, 49.3; H, 4.1; O, 16.4 percent. Also present in the reaction mixture was a small quantity of cyclohexa-1,3-diene-dicobalt hexacarbonyl.

Example III

A mixture comprising 0.86 gram of dicobalt octacarbonyl and 4.1 grams of 2,3-dimethylbuta-1,3-diene in 40 ml. of light petroleum ether was heated at reflux for two hours under nitrogen. After removal of volatile material by heating in vacuo, the orange residue was dissolved in ether and chromatographed on alumina using as the eluant a light petroleum-ether mixture. The first fraction, after recrystallization from ether, gave a good yield (60 percent) of di(2,3-dimethylbuta-1,3-diene)dicobalt tetracarbonyl as red needles. Found: C, 48.8; H, 5.3; O, 16.5; Co, 29.9 percent with a molecular weight of 433. $C_{16}H_{20}O_4Co_2$ requires: C, 48.8; H, 5.1; O, 16.2; Co, 29.9 percent with a molecular weight of 394. A second fraction yielded red needles of 2,3-dimethylbuta-1,3-dienedicobalt hexacarbonyl on recrystallization from light petroleum ether at −20° C. On analysis of this compound, there was found: C, 37.9; H, 3.8; O, 24.8 percent. $C_{12}H_{10}O_6Co_2$ requires: C, 39.2; H, 3.7; O, 26.1 percent.

Under conditions similar to those employed in the above examples, dicobalt octacarbonyl was reacted with both isoprene and buta-1,3-diene to yield compounds analogous to those reported in the above examples.

The compounds of the invention have a variety of uses. Many, for example, are useful as additives to hydrocarbon fuels and lubricants. When added to a hydrocarbon fuel of the gasoline boiling range, they are found to increase the octane number of the fuel. The compounds may be added to gasoline along with halohydrocarbon scavengers such as ethylene dichloride and ethylene dibromide, phosphorus ignition control compounds such as tricresyl phosphate, and other antiknock agents such as tetraethyllead, methylcyclopentadienyl manganese tricarbonyl and the like. They are also useful as additives to distillate fuels such as jet fuels, home heater fuels, and diesel fuels to reduce the quantity of smoke and soot formed on combustion of the fuel. Another use for the compounds is as additives to lubricants to improve their lubricity.

The compounds may also be employed as metal-plating agents. When so used, they are decomposed at elevated temperatures so as to lay down a metallic film on a substrate material. Preferably, the plating operation is carried out in the presence of an inert gas so as to prevent oxidation of the metal coating or substrate material during the plating operation. The metal films, for example, may be employed to produce a decorative effect on the substrate material, to increase its resistance to corrosion, and to form a conductive surface. In the latter application, the compounds can be employed in forming printed circuits by decomposing the organometallic compound so that it lays down an electrically conductive metallic film on a substrate surface that is covered by a stencil which defines the circuit.

The usefulness of the present products as metal-plating agents is enhanced by the fact that they decompose readily upon sublimation and that on prolonged heating, even in the presence of a solvent, they tend to decompose to produce the metal in elemental form.

I claim:

1. As a composition of matter a molecular complex consisting of one to two non-cumulated diolefin molecules having 4 to 7 carbon atoms, selected from the class consisting of acyclic diolefins, cyclohexadienes and cycloheptadienes, two cobalt atoms and 4 to 6 carbonyl radicals.
2. The compound of claim 1 containing two non-cumulated diolefin molecules.
3. As a new composition of matter, dinorbornadiene dicobalt tetracarbonyl.
4. Dicyclohexa-1,3-dienedicobalt tetracarbonyl.
5. Di(2,3-dimethylbuta-1,3-diene)dicobalt tetracarbonyl.
6. Di(isoprene)dicobalt tetracarbonyl.
7. Di(buta-1,3-diene)dicobalt tetracarbonyl.
8. The compound of claim 1 having one non-cumulated diolefin molecule.
9. Norbornadiene dicobalt hexacarbonyl.
10. Cyclohexa-1,3-dienedicobalt hexacarbonyl.
11. 2,2-dimethylbuta-1,3-dienedicobalt hexacarbonyl.
12. Isoprene dicobalt hexacarbonyl.
13. Buta-1,3-dienedicobalt hexacarbonyl.
14. Process for the preparation of the compound of claim 1, said process comprising reacting, at substantially atmospheric pressure, a non-cumulated diolefin having 4 to 7 carbon atoms selected from the class consisting of acyclic diolefins, cyclohexadienes and cycloheptadienes, with dicobalt octacarbonyl.
15. Process for the preparation of dinorbornadiene dicobalt tetracarbonyl, said process comprising reacting, at substantially atmospheric pressure, norbornadiene with dicobalt octacarbonyl.
16. Process for the preparation of dicyclohexa-1,3-dienedicobalt tetracarbonyl, said process comprising reacting, at substantially atmospheric pressure, dicobalt octacarbonyl with cyclohexa-1,3-diene.
17. Process for the preparation of di(2,3-dimethylbuta-1,3-diene)dicobalt tetracarbonyl, said process comprising reacting, at substantially atmospheric pressure, 2,3-dimethylbuta-1,3-diene with dicobalt octacarbonyl.
18. Process for the preparation of diisoprene dicobalt tetracarbonyl, said process comprising reacting, at substantially atmospheric pressure, isoprene with dicobalt octacarbonyl.
19. Process for the preparation of di(buta-1,3-diene)-dicobalt tetracarbonyl, said process comprising reacting, at substantially atmospheric pressure, buta-1,3-diene with dicobalt octacarbonyl.

References Cited in the file of this patent

UNITED STATES PATENTS

| Re. 24,653 | Prichard | May 26, 1959 |
| 2,409,167 | Veltman | Oct. 8, 1946 |

FOREIGN PATENTS

| 568,301 | Canada | Dec. 30, 1958 |

OTHER REFERENCES

Greenfield et al.: Journal of Organic Chemistry, vol. 21, pages 875–878 (1956).

Winkhaus et al.: J. Chem. Soc., pages 602–605, February 1961.

UNITED STATES PATENT OFFICE
CERTIFICATE OF CORRECTION

July 14, 1964

Patent No. 3,141,031

Geoffrey Wilkinson

It is hereby certified that error appears in the above numbered patent requiring correction and that the said Letters Patent should read as corrected below.

Column 4, line 18, for "2,2-dimethylbuta-" read -- 2,3-dimethylbuta- --.

Signed and sealed this 24th day of November 1964.

(SEAL)
Attest:

ERNEST W. SWIDER
Attesting Officer

EDWARD J. BRENNER
Commissioner of Patents